(12) United States Patent
Tong

(10) Patent No.: US 7,276,195 B1
(45) Date of Patent: Oct. 2, 2007

(54) MALEIMIDE BASED HIGH TEMPERATURE SHAPE MEMORY POLYMERS

(75) Inventor: Tat Hung Tong, Bellbrook, OH (US)

(73) Assignee: Cornerstone Research Group, Dayton, OH (US)

( * ) Notice: Subject to any disclaimer, the term of this patent is extended or adjusted under 35 U.S.C. 154(b) by 0 days.

(21) Appl. No.: 11/493,218

(22) Filed: Jul. 26, 2006

Related U.S. Application Data

(62) Division of application No. 10/860,360, filed on Jun. 3, 2004, now abandoned.

(60) Provisional application No. 60/476,050, filed on Jun. 5, 2003.

(51) Int. Cl.
*B29C 33/40* (2006.01)
*C08F 22/40* (2006.01)

(52) U.S. Cl. ............ 264/219; 264/230; 264/334; 425/440; 526/262; 526/347; 526/347.1

(58) Field of Classification Search ........... 526/262, 526/347, 347.1; 264/219, 230, 334; 425/440
See application file for complete search history.

(56) References Cited

U.S. PATENT DOCUMENTS

| 4,446,028 A | 5/1984 | Becker |
|---|---|---|
| 4,945,127 A | 7/1990 | Kagawa et al. |
| 5,057,252 A | 10/1991 | Kagawa et al. |
| 5,145,935 A | 9/1992 | Hayashi |
| 5,506,300 A | 4/1996 | Ward et al. |
| 5,665,822 A | 9/1997 | Bitler et al. |
| 6,156,842 A | 12/2000 | Hoenig et al. |
| 6,503,421 B1 | 1/2003 | Wang et al. |
| 6,759,481 B2 * | 7/2004 | Tong .................. 525/241 |
| 6,803,168 B1 | 10/2004 | Padmanaban et al. |
| 6,827,325 B2 * | 12/2004 | Hofmann et al. ......... 249/134 |
| 6,849,554 B2 | 2/2005 | Rattner et al. |
| 6,986,855 B1 * | 1/2006 | Hood et al. ............. 264/219 |
| 2003/0170564 A1 | 9/2003 | Kido et al. |
| 2003/0207579 A1 | 11/2003 | Rattner et al. |

OTHER PUBLICATIONS

Gordon, R.F., "Applications of Shape Memory Polyurethanes", SMST International Committee, 1994, pp. 115-120.
Zeon Chemicals L.P., Material Safety Data Sheet—Norsorex, Mar. 31, 1999, 6 pages, Louisville, KY.
Zeon Chemicals L.P., General Brochure, 2000, 3 pages, Louisville, KY.
Polynorbornene Product No. 453056 information sheet, 1 pages, 2000.
Elastomer Solutions, Norsorex, Product Release, by Zeon Chemicals L.P., 2000, 1 pages, Louiseville, KY.

* cited by examiner

*Primary Examiner*—Helen L Pezzuto
(74) *Attorney, Agent, or Firm*—Wegman, Hessler & Vanderburg

(57) ABSTRACT

Shape memory polymers prepared by copolymerizing two monomers, which each separately produce polymers characterized by different glass transition temperatures in the presence of a multi-functional monomer whereby the copolymer formed is cross-linked during the polymerization to form a thermoset network. The transition temperature of the final polymers is adjusted by the ratio of the monomers selected, to from about 150° C. to about 270° C., while the degree of crosslinking controls the rubbery modulus plateau. The shape memory polymers can be processed as castable formulations in the form of bulk articles, coatings and films. The invention also relates to the articles of manufacture thereof and methods of the preparation and use thereof.

5 Claims, 1 Drawing Sheet

MALEIMIDE BASED HIGH TEMPERATURE SHAPE MEMORY POLYMERS

CROSS-REFERENCE TO RELATED APPLICATION

This application is a divisional application of U.S. Patent application Ser. No. 10/860,360 filed Jun. 3, 2004, now abandoned, which, in turn, claims priority from U.S. Provisional Application Ser. No. 60/476,050 filed Jun. 5, 2003.

FIELD OF INVENTION

The invention relates to shape memory polymers (SMP), their production, and use. More particularly, the SMP comprises a maleimide based polymer or copolymer present in the form of a cross-linked thermoset network.

BACKGROUND OF THE INVENTION

Shape memory materials are those materials that can be "fixed" to a temporary and dormant shape under specific conditions of temperature and stress and later, under thermal, electrical, or environmental command, the associated elastic deformation can be completely or substantially relaxed to the original, stress-free, condition.

One class of shape memory materials studied and utilized are the shape memory alloys (SMA). The shape memory capabilities of the various metallic materials (shape memory alloys) capable of exhibiting shape memory characteristics occur as the result of the metallic alloy undergoing a reversible crystalline phase transformation from one crystalline state to another crystalline state with a change in temperature and/or external stress. In particular, alloys of nickel and titanium, for example, nitanol exhibit these properties of being able to undergo energetic crystalline phase changes at ambient temperatures, thus giving them shape memory. Such alloys have shape memory effects that exploit the deformation behavior difference between a high temperature austenite phase (parent phase) and the room temperature martensite phase, a first-order phase transition separating the two phases. With a temperature change of as little as about 10° C., this alloy can exert a stress as large as 415 MPa when applied against a resistance to changing its shape from its deformed state. Such alloys have been used for such applications as intelligent materials and biomedical devices. Their applications, however, have been limited in part because they are relatively expensive, but also due to limited strain, ca 8%.

Shape memory polymers (SMPs) are being developed to replace or augment the use of shape memory metal alloys (SMAs), in part because the polymers are light in weight, high in shape recovery ability, easy to manipulate, and because they are economical as compared with SMAs.

Polymers intrinsically show shape memory effects on the basis of rubber elasticity but with varied characteristics of temporary shape fixing, strain recovery rate, work capability during recovery, and retracted state stability. The first shape memory polymer (SMP) reported as such was cross-linked polyethylene; however, the mechanism of strain recovery for this material was immediately found to be far different from that of the shape memory alloys. Indeed, a shape memory polymer is actually a super-elastic rubber. When the polymer is heated to a rubbery state, it can be deformed under resistance of ~1 MPa modulus. When the temperature is decreased below either a crystallization temperature ($T_m$) or glass transition temperature ($T_g$), the deformed shape is fixed by the higher rigidity of the material at lower temperature while, at the same time, the mechanical energy expended on the material during deformation will be stored. When the temperature is raised above transition temperature ($T_g$ or $T_m$), the polymer will recover to its original form as driven by the restoration of network chain conformation entropy. Thus, favorable properties for SMPs will closely link to the network architecture and to the sharpness of the transition separating the rigid and rubber states. Compared with SMAs, SMPs have an advantage of high strain (to several hundred percent) because of the large rubbery compliance while the maximum strain of the SMA is less than 8%. As an additional advantage, due to the versatility of polymer, the properties of SMPs can be tailored according to the application requirements, a factor that is very important in industry.

Several physical properties of SMPs other than the ability to memorize shape are significantly altered in response to external changes in temperature and stress, particularly at the melting point or glass transition temperature of the soft segment. These properties include the elastic modulus, hardness, flexibility, vapor permeability, damping, index of refraction, and dielectric constant. The elastic modulus (the ratio of the stress in a body to the corresponding strain) of an SMP can change by a factor of up to 200 when heated above its melting point or glass transition temperature. Also, the hardness of the material changes dramatically when it is at or above its melting point or glass transition temperature. When the material is heated to a temperature above the melting point or glass transition temperature, the damping ability can be up to five times higher than a conventional rubber product. The material can readily recover to its original molded shape following numerous thermal cycles.

Heretofore, numerous polymers have been found to have particularly attractive shape memory effect, most notably the polyurethanes, polynorbornene, styrene-butadiene copolymers, and cross-linked polyethylene. Other SMPs include alkyated, cyano, alkoxylated mono or diesterified imides or carboxylic acid derivatives. In addition, copolymers and homopolymers of dimethaneoctahydronapthalene (DMON) are known. However, the processing of these polymers has given rise to numerous difficulties.

In the literature, polyurethane-type SMPs have generally been characterized as phase segregated linear block copolymers having a hard segment and a soft segment. The hard segment is typically crystalline, with a defined melting point, and the soft segment is typically amorphous, with a defined glass transition temperature. In some embodiments, however, the hard segment is amorphous and has a glass transition temperature rather than a melting point. In other embodiments, the soft segment is crystalline and has a melting point rather than a glass transition temperature. The melting point or glass transition temperature of the soft segment is substantially less than the melting point or glass transition of the hard segment.

Examples of polymers used to prepare hard and soft segments of known SMPs include various polyacrylates, polyamides, polysiloxanes, polyurethanes, polyethers, polyether amides, polyurethane/ureas, polyether esters, and urethane/butadiene copolymers. See for example, U.S. Pat. No. 5,506,300 to Ward et al.; U.S. Pat. No. 5,145,935 to Hayashi; U.S. Pat. No. 5,665,822 to Bitler et al.; and Gorden, "Applications of Shape Memory Polyurethanes," *Proceedings of the First International Conference on Shape Memory and Superelastic Technologies*, SMST International Committee, pp. 115-119 (1994).

It has also been proposed to use highly crosslinked homopolymers with $T_g$>room temperature and long-lived entanglements serving as crosslinks. However, the use of entanglements as the sole origin of elasticity leads to significant difficulties in the processing thus leading to the required use of plasticizers that ultimately hamper shape memory performance. Existing shape memory polymers have been prepared on the basis of polyurethane (Mitsubishi), and Norsorex™ (Nippon Zeon) and used as a rubber. Neither can be cast to complex shape without the use of solvents. The aforementioned severe limitations emphasize the need for castable, reactive formulations, in which the stress-free state is formed during the polymerization process itself. In such a case, shape memory castings (solid objects), films, coatings, and adhesives could all be processed from the same formulation but altered processing schemes.

Recently, a process to make molds for casting composite parts out of novel shape memory polymers has been described in U.S. patent application Ser. No. 10/056,182 of common assignment herewith. In that invention, a liquid resin is injected into a mold thermoformed using a SMP sheet, and after the part cures, the mold is simply raised above the $T_g$ of the SMP, which allows the mold to retract to a flat sheet. Molds made of this class of polymer that possess shape memory mechanical properties have the greatest advantage over conventional metal molds in the demolding. Molds composed of these SMPs create a gentle, automated, and simple demolding process. Conventional, rigid material molds have a tendency to remain adhered to the parts in high detailed areas; therefore, most demolding actions are usually very violent. This means that a large percentage of parts that were of good quality before the demolding process are unusable after this step in conventional processes. The slow natural retracting motion of the SMP class of polymers helps to solve this problem. Also, since the SMP material returns to the original shape given, it can be ready formed into another mold. By utilizing the properties that the SMPs possess, many problems that are found in current metal molds can be solved. The SMP material can be easily produced and is inexpensive. The SMP can be made to retain intricate detail. Also, another favorable property of the SMP is that it is transparent. This allows visual inspection of the mold and article therein during the injection and cure steps.

Composite parts have previously been cast in molds made of thermoplastics. However, the use of shape memory polymers as molds was not previously feasible in industrial applications. This was due to the fact that the glass transition temperatures of the SMP materials available were too low. Therefore in most cases, the temperature that was required to cure the resin to form the desired part was higher than the glass transition temperature of the SMP material. This meant that the mold itself would deform back to its original shape before the resin part had a chance to cure.

SUMMARY OF THE INVENTION

The maleimide-based shape memory polymers with high glass transition temperatures that are described in this invention have high glass transition temperatures and are well adapted for use in making SMP molds as set forth in aforementioned patent application Ser. No. 10/056,182. These new materials allow the needed elevated temperatures to be reached inside the mold to cure the resin part without exhibiting deformation of the mold itself.

Shape memory polymers (SMPs) are a unique class of polymers, which soften and harden quickly and repetitively on demand. This feature provides the ability to temporarily soften, change shape, and harden back to a solid structural state in various new highly detailed shapes and forms. SMPs have a very narrow temperature span in which they transition from hard to soft and vise versa. This narrow glass transition temperature span is a key physical property that allows a SMP to maintain full structural rigidity up to a specifically designed activation temperature. Yet with as little as 5° C. to 10° C. increase above that temperature, it quickly softens and allows shape change and subsequent re-hardening into new shapes. SMPs possessing high $T_g$, such as the invention described here, are particularly useful in applications that will change shape at some stage but need the structure to stay rigid at higher operating temperature (greater than 100° C.), such as a morphing aerospace structures and SMP molding processes.

In accordance with the invention, a new shape memory polymer with high temperature capability (greater than 100° C.) has now been developed that finds particular application in the making of molds for composite manufacturing and in high performance structural components that require shape change capability.

In accordance with the present invention, the SMPs are a reaction product of two monomers. The first monomer is selected from the category of maleimide-based monomers, and the second monomer is another vinyl monomer. The polymerization reaction forms castable shape memory polymers with glass transition temperatures higher than 100° C. The reaction also includes addition of a multifunctional crosslinking agent into the polymerization reaction so that the copolymer is crosslinked during polymerization to form a thermoset network. In addition to the two noted monomers and the multifunctional crosslinking agent, an initiator such as an organic peroxide compound is also present. The transition temperatures of the final polymers are adjusted by the ratio of the monomers selected so that the resulting polymer has a $T_g$ of from about 150° C. to about 270° C. while the degree of crosslinking controls the rubbery modulus plateau. The shape memory polymers of the invention are castable. In addition, the instant SMPs can also be employed in structural components that require shape change during operation such as a morphing wing for an aircraft or deployable antennae.

DETAILED DESCRIPTION

The SMP polymers are crosslinked maleimide based homo and copolymers. It is preferred that the SMP is a copolymer formed from maleimide based monomer and another non-maleimide, vinyl monomer.

This new copolymer is prepared from a reaction mixture which includes, in addition to maleimide-based monomer and the vinyl compound, a crosslinking agent and an initiator. By careful preparation of the reaction mixture the glass transition temperature, $T_g$ of the resulting shape memory polymer can be synthesized to match the operating temperature of the composite manufacturing process and morphing structures.

In a preferred embodiment of the present invention, the reaction mixture includes, in addition to the first monomer, which is N-arylmaleimide, such as N-phenylmaleimide or N-alkylmaleimide, such as N-ethylmaleimide, the second monomer, which is a vinyl compound other than maleimide, the crosslinking agent, which is a multifunctional compound, and an initiator, a fifth component, wherein the fifth component is a modifying polymer.

The second monomer, a vinyl compound, is preferably vinyl benzene (styrene), vinyl neodecanoate, vinyl benzoate, vinyl propionate, vinyl stearate, α methylstyrene, which may be a mixture, 3-methylstyrene or 4-methylstyrene, a vinyl pyridine, which may be a mixture, 2-vinyl pyridine, 3-vinyl pyridine or 4-vinyl pyridine, vinyl laurate, vinyl butyrate, vinyl acetate, vinyl stearate, vinyl 2-furate, vinyl phenylacetate, vinyl carbazole, 4-vinylbenzyl acetate, 4-vinylbenzoic acid, vinyl methyl sulfone, vinyl octadecyl ether, vinyl isooctyl ether, N-vinyl-2-pyrrolidone, N-vinyl-N-methylacetamide, 1-vinylimidazole, N-vinylformamide, N-vinylcaprolactam, vinyl azolactone, N-vinylurea, 4-(vinyloxy) butyl stearate, 4-(vinyloxy)butyl benzoate, 4-(vinyloxymethyl)cyclohexylmethyl benzoate, methyl acrylate, methyl methacrylate, butyl acrylate, t-butyl acrylate, butyl methacrylate, t-butyl methacrylate, hexyl acrylate, acrylic acid, methacrylic acid, benzyl acrylate, benzyl methacrylate, 2-n-butoxyethyl methacrylate, 2-cyanoethyl acrylate, cyclohexyl acrylate, cyclohexyl methacrylate, decyl acrylate, dicyclopentenyl acrylate, dicyclopentenyloxyethyl acrylate, dicyclopentenyloxyethyl methacrylate, dodecyl acrylate, dodecyl methacrylate, 2-ethoxyethyl methacrylate, 2-ethylhexyl acrylate, ethyl methacrylate, 2-hydroxyethyl acrylate, 2-hydroxyethyl methacrylate, isobornyl acrylate, isobornyl methacrylate, 2-(2-methoxyethoxy)ethyl acrylate, 2-(2-methoxyethoxyl)-ethyl methacrylate, 2-methoxyethyl acrylate, 2-methoxyethyl methacrylate, 2-methoxypropyl acrylate, 2-methoxypropyl methacrylate, octyl methacrylate, 2-phenoxyethyl acrylate, 2-phenoxyethyl methacrylate, phenyl acrylate, 2-phenylethyl acrylate, 2-phenylethyl methacrylate, phenyl methacrylate, propyl acrylate, propyl methacrylate, stearyl acrylate, stearyl methacrylate, 2,4,6-tribromophenyl acrylate, undecyl acrylate or undecyl methacrylate.

Of the vinyl compounds preferred for use in the reaction mixture of the shape memory polymer of the present invention, vinyl benzene, vinyl benzoate, α methylstyrene, or a vinyl pyridine are particularly preferred. Styrene (i.e., vinyl benzene) is most preferred.

The crosslinking agent of the shape memory polymer reaction mixture is multifunctional, that is, the crosslinking agent is a compound that has a polymerizable functionality of at least 2. Indeed, difunctional crosslinking agents are preferred. Crosslinking agents within the scope of the present invention include Bismaleimides (BMIs), such as 1,1'-(methylenedi-4,1-phenylene)bismaleimide, diallyl fumarate, diallyl diglycol carbonate, allyl methacrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-hexadiene, 1,6-hexanediol diacrylate, 1,6-hexanediol diacrylate, 1,6-hexanediol dimethacrylate, N,N'-methylenebismethacrylamide, 1,9-nonanediol dimethacrylte, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis (2-methacryloxyethyl)phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl)cyclohexylmethyl]glutarate, bis[-(vinyloxy)butyl]succinate, bis((4-((-vinyloxy)methyl)cyclohexyl)methyl)isophthalate, bis(4-(vinyloxy)butyl)terephthalate, bis[[(4-[vinyloxy)methyl)cyclohexyl]methyl] terephthalate, bis[4-vinyloxy)butyl]adipate, bis[4-(vinyloxy)butyl] (methylenedi-1,4-phenylene)biscarbamate, bis[4-(vinyloxy)butyl] (4-methyl-1,3-phenylene)biscarbamate, bis[4-(vinyloxy)butyl] 1,6-hexanediylbiscarbamate or tris[4-(vinyloxy)butyl] trimellitate.

Of these preferred crosslinking agents, BMIs and divinyl benzene are particularly preferred.

The initiator of the reaction mixture may be any of the well known initiators such as a free radical or an ionic initiator. Also, ultraviolet and gamma irradiation can be used.

Preferred, free radical initiators within the scope of the present invention include organic peroxides and azo compounds. Although any of the commercially available organic peroxides may be utilized, tert-butyl peroxide, tert-butyl hydroperoxide, benzoyl peroxide, dicumyl peroxide and lauroyl peroxide are particularly preferred. Similarly, although any commercially available azo initiating compounds may be utilized, 2,2'-azobisisobutyronitrile is particularly preferred. Ionic initiators may also be mentioned and are preferably cationic initiators. Preferred cationic initiators include boron trifluoride, boron trifluoride diethyl etherate, aluminum trichloride and tin (IV) chloride.

As stated above, the SMP reaction mixture may include a fifth, optional component. This optional component is a modifying polymer. The modifying polymer acts as a viscosity adjustor and, additionally provides the requisite toughness to the resultant shape memory polymer. The requisite toughness of the cured shape memory polymer product is a toughness that meets the quantative requirements set forth in ASTM Standard Test Procedures D5045 and D6068.

The modifying polymer of the shape memory polymer reaction mixture is a thermoplastic polymer that is compatible with the polymer formed by the reaction product of styrene and a vinyl compound. Preferred compatible polymers include olefin polymers and styrene polymers. Particularly preferred compatible polymers include polystyrene, poly(styrene-co-butadiene), polysulfone polyethylene and polypropylene. Of these, polystyrene is particularly preferred as the modifying polymer in the shape memory polymer reaction mixture. When the optional modifying polymer is used, the resulting reaction product includes two distinct polymers, namely the SMP polymer and the "modifying" polymer.

The constituents of the shape memory polymer reaction mixture are present such that the maleimide monomer constituent represents between about 30% to about 99%, the vinyl monomer (other than maleimide) constitutes between about 0% and about 60%, the crosslinking agent constitutes between about 0.5% and about 5%, the initiator is present in a concentration in the range of between about 0.1% and about 4% and the modifying polymer, if present, represents between about 0.5% and about 60%, all of the above recited percentages being by weight based on the total weight of the shape memory polymer reaction mixture (100 wt %).

Preferably, the constituents of the shape memory polymer reaction mixture are present in the following concentration ranges, again reported as percentage by weight, based on the total weight of the reaction mixture: maleimide monomer, about 50% to about 98%; vinyl monomer (other than maleimide), about 2% to about 50%; crosslinking agent, about 0.6% to about 3%; initiator, about 0.5% to about 3%; and modifying polymer, if present about 5% to about 50%. All of the foregoing add up to 100 wt %.

More preferably, the constituents of the shape memory polymer reaction mixture include between about 60% and about 97% maleimide monomer; between about 5% and about 40% vinyl monomer; between about 1% and about 2.5% initiator; and, if present, between about 10% and about 40% modifying polymer. As previously, these percentages are by weight, based on 100 wt % of the shape memory polymer reaction mixture.

The shape memory polymer reaction mixture is polymerized by reacting the mixture at a temperature in the range of between about 20° C. and about 200° C. and a pressure in the range of between about 14.7 psi and about 50 psi over a time period in the range of between about 2 seconds and 4 days to produce a crosslinked shape memory polymer. In addition, the shape memory polymer reaction mixture can be polymerized by the application of ultraviolet light or visible light with the presence of a photoinitiator or by the application of high energy electron beam radiation.

In a preferred embodiment, the polymerization reaction, to produce the thermosetting shape memory polymer of the present invention, occurs at a temperature in the range of between about 65° C. and about 180° C. and a pressure in the range of about 14.7 psi over a period of between about 4 hours and about 1.25 days.

The shape memory phenomenon in the vicinity of $T_g$ and the ability to set the value of $T_g$ by varying the composition over a very broad range of temperatures allows contemplation of numerous applications in varied uses when thermoreversibility of a geometric shape is the desired aim.

EXAMPLES

The invention will now be further described with reference to a number of specific examples which are to be regarded solely as illustrative and not as restricting the scope of the invention.

Example 1

A formulation was made with 97 wt % of N-phenylmaleimide, 1 wt % of bismaleimide and 2 wt % of dicumyl peroxide. A mixture with a composition described above was polymerized by heating at 110° C. in an oven for 24 hours to obtain the cured shape memory polymer. The cured shape memory polymer was further postcured at 100° C., 120° C., 150° C. in vacuum for 2 hours each and finally at 177° C. for 4 hours, also in vacuum, to obtain a shape memory polymer with $T_g$ of 268° C.

At the conclusion of this polymerization reaction a clear sheet of a cured shape memory polymer was obtained.

Example 2

A formulation was made with 67 wt % of N-phenylmaleimide, 1 wt % of bismaleimide, 2 wt % of dicumyl peroxide, and 30 wt % of styrene monomer. A mixture with a composition described above was polymerized by heating at 100° C. in an oven for 24 hours to obtain the shape memory polymer. The cured shape memory polymer was further postcured at 100° C., 120° C., 150° C. in vacuum for 2 hours each and finally at 177° C. for 4 hours, also in vacuum, to obtain shape memory polymer with $T_g$ of 184° C.

At the conclusion of this polymerization reaction a clear sheet of a cured shape memory polymer was obtained.

Example 3

A formulation and procedure similar to that of Example 2 were used except that the styrene component was reduced to 5 wt % with a commensurate increase in the presence of N-phenylmaleimide to 92 wt %.

Example 4

A formulation and procedure similar to that of Example 2 were used except that the styrene component was reduced to 12 wt % with a commensurate increase in the presence of N-phenylmaleimide to 85 wt %.

Example 5

A formulation and procedure similar to that in Example 2 were used except that the styrene component was reduced to 20 wt % with a commensurate increase in the presence of N-phenylmaleimide to 77 wt %.

BRIEF DESCRIPTION OF THE FIGURES

The glass transition temperatures of the Examples 1-5 polymers are shown in FIG. 1 (wherein the reference numbers correspond to the polymer preparation example numbers).

Figure 1:
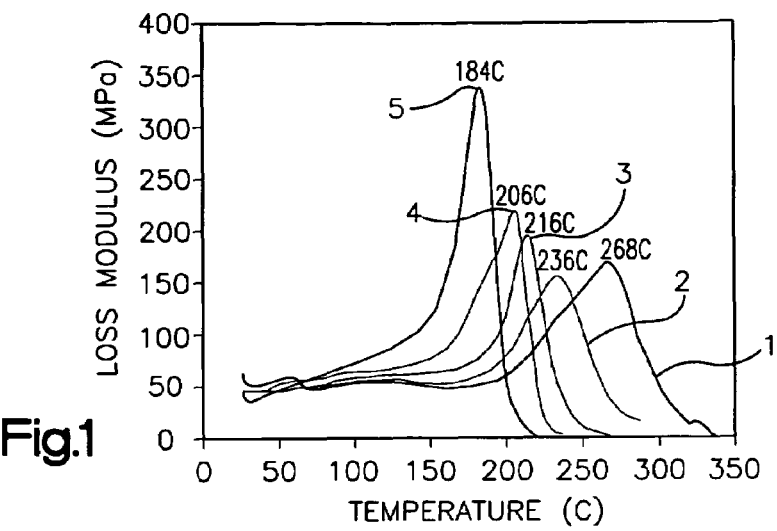
Figure 2:
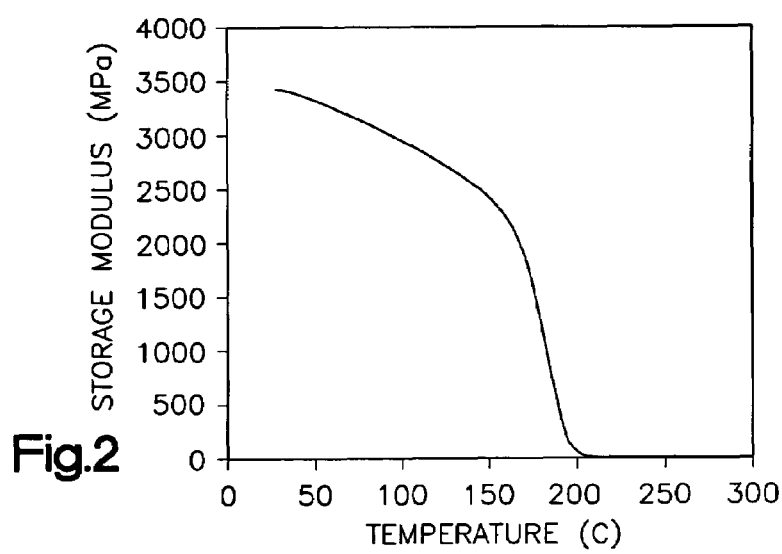
FIG. 2 shows the storage modulus of the Example 2 polymer proceeding from rigid state to soft state.
Figure 3:
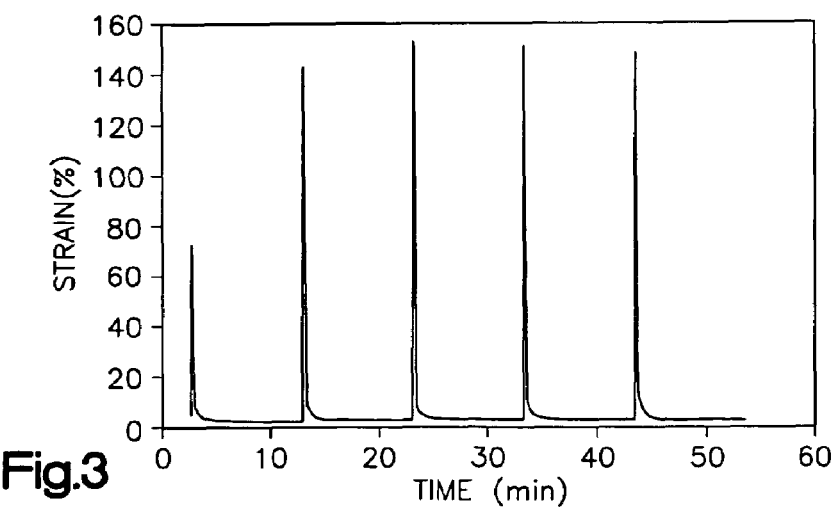
FIG. 3 shows the repeatability of the elongation and strain recovery of the Example 2 copolymer.

In accordance with the above, the shape memory polymer in accordance with the invention is prepared from a maleimide monomer (a) having the structure

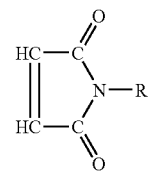

wherein R is H, $C_1$-$C_{12}$ alkyl or aryl. Preferred alkyl substitutes for R are the lower ($C_1$-$C_4$ alkyl) moieties. This polymer has a glass transition temperature of about greater than about 100° C., preferably greater than about 150° C. As per the above, the polymer exists in the form of a crosslinked thermoset network. Preferably, the polymer is prepared from a second monomer, monomer (b) which comprises a vinyl compound, other than a maleimide compound. Presently, it is preferred that the maleimide monomer, monomer (a), be present in an amount of 1-12 mols per mol of the second vinyl monomer, monomer (b). Preferably, the maleimide monomer is N-phenylmaleimide. Glass transition temperatures for the resulting SMP polymer of about 180° C.-270° C. are most preferred and achieved in accordance with the invention when the second monomer, monomer (b), is styrene in varying molar amounts relative to monomer (a).

Reaction mixtures suitable for forming the crosslinked shape memory polymer thermoset comprise about 30-99 wt % of monomer (a) wherein R is aryl or $C_1$-$C_4$ lower alkyl; a vinyl monomer (b) other than maleimide present in an amount by weight of 0-60 wt %; a crosslinking agent (c) present in an amount of between about 0.5-5 wt % and a polymerization inhibitor (d) present in an amount of about 0.1-4% by weight. Further, the reaction mixture may comprise a viscosity modifying polymer (e) present in an amount of about 0.0-60 wt %.

In order to make the maleimide SMPs in accordance with the invention, it is not necessary to dissolve the monomers in any particular solvent. Instead, the monomers are mixed in the liquid state and the liquid may be put into a mold for curing. After the curing process, the material is hardened to result in the SMP.

The shape memory polymers of the present invention are preferably utilized to form a mold. In accordance with the preferred end use of the SMPs, a mold is formed from the requisite shape memory polymers. A molten material, such as a resin, is admitted into the mold and cured at a temperature of less than about 150° C., preferably greater than about 100° C. and less than about 150° C., to produce the desired molded object. Then, the mold is heated to a temperature of about 150° C. and greater to relax the mold to its relaxed state to thereby aid in the separation of the molded product from the mold. Most preferably, the SMP has a glass transition temperature of about 180° C.-270° C., and the mold is heated after the object is cured therein to a range within this preferred glass transition temperature.

As a general guide, the SMPs in accordance with the invention may be used in a variety of end use applications such as molds for composite manufacturing, structural deployment devices for remote systems, games and toys, domestic articles, arts and ornamentation units, medical and paramedical instruments and devices, thermosensitive instruments and security devices, office equipment, garden equipment, educational articles, tricks, jokes, and novelty items, building accessories, hygiene accessories, automotive accessories, films, and sheaves for retractable housings and packaging, coupling material for pipes of different diameters, building game accessories, folding games, scale model accessories, bath toys, boot and shoe inserts, skiing accessories, suction devices for vacuum cleaners, pastry making accessories, camping articles, adaptable coat hangers, retractable films and nets, sensitive window blinds, isolation and blocking joints, fuses, alarm devices, sculpture accessories, adaptable hairdressing accessories, plates for Braille that can be erased, medical prostheses, orthopedic devices, furniture, deformable rollers, and recoverable printing matrices and other end uses.

While certain features of this invention have been described in detail with respect to various embodiments thereof, it will, of course, be apparent that other modifications can be made within the spirit and scope of this invention, and it is not intended to limit the invention to the exact detail shown above except insofar as there defined in the appended claims.

What is claimed is:

1. Method of molding a product comprising:
   a. forming a mold from a shape memory polymer prepared from a reaction mixture comprising a monomer (a) having the structure

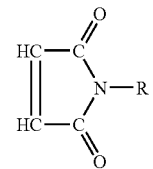

wherein R is H, $C_1$-$C_{12}$ alkyl or aryl, said polymer having a glass transition temperature of about greater than 100° C.;
   b. admitting a molten material into said mold;
   c. curing said molten material at a temperature of greater than about 100° C. to form said product; and
   d. heating said mold to a temperature of about 150° C. and greater to relax said mold to thereby aid in separation of said product from said mold.

2. Method as recited in claim 1 wherein said curing (c) comprises curing at a temperature of less than about 150° C.

3. Method as recited in claim 2 wherein said shape memory polymer has a glass transition temperature of about 180°-270° C. and said step (d) comprises heating said mold to a temperature of about 180° to about 270° C.

4. Method as recited in claim 2 wherein said shape memory polymer is a copolymer comprising repeat units formed polymerization reaction of N-phenylmaleimide monomers and styrene monomers.

5. Method as recited in claim 4 wherein the molar ratio of N-phenylmaleimide monomers to styrene monomers is about 1-12 to 1.

\* \* \* \* \*